No. 868,555. PATENTED OCT. 15, 1907.
T. HANSEN.
MACHINE FOR MAKING VULCANIZED FIBER TUBES.
APPLICATION FILED JULY 22, 1904.
5 SHEETS—SHEET 5.
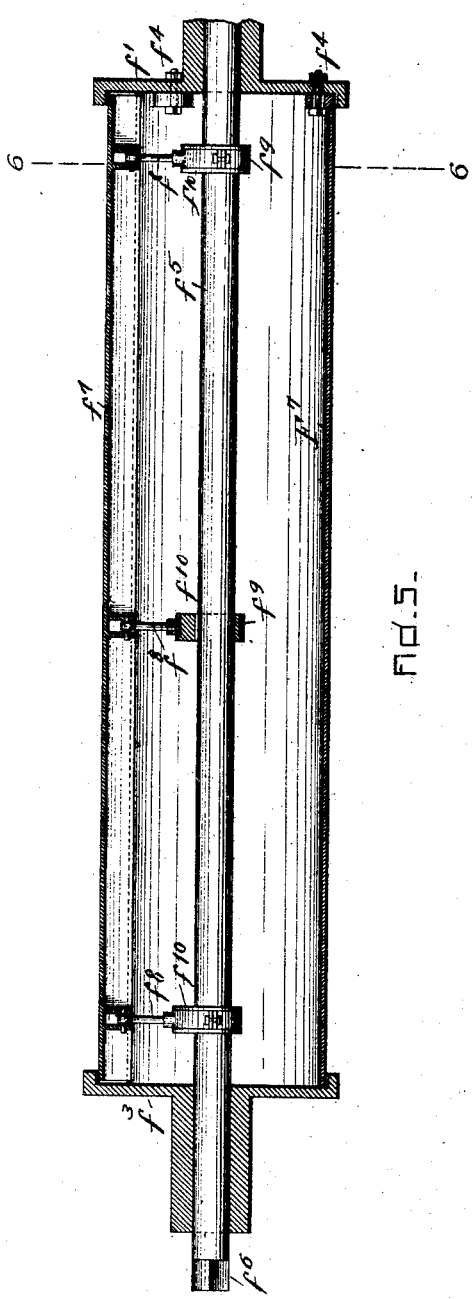
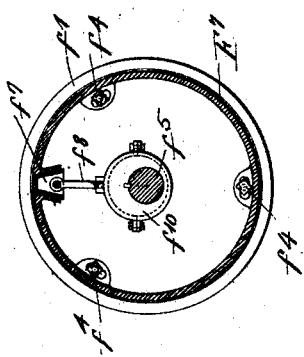

UNITED STATES PATENT OFFICE.

THORVALD HANSEN, OF EVERETT, MASSACHUSETTS, ASSIGNOR, BY MESNE ASSIGNMENTS, TO STANDARD FIBRE COMPANY, OF SOMERVILLE, MASSACHUSETTS.

MACHINE FOR MAKING VULCANIZED-FIBER TUBES.

No. 868,555.     Specification of Letters Patent.     Patented Oct. 15, 1907.

Application filed July 22, 1904. Serial No. 217,604.

*To all whom it may concern:*

Be it known that I, THORVALD HANSEN, of Everett, in the county of Middlesex and State of Massachusetts, a citizen of the United States, have invented a new and useful Improvement in Machines for Making Vulcanized-Fiber Tubes, of which the following is a specification.

The machine embodying my invention is intended primarily to make vulcanized fiber tubes for use in making roving cans, and while machines have heretofore existed in which a tube was formed by winding a sufficient number of layers of a web of paper upon a mandrel, and attaching them together during the winding operation by paste or otherwise, my machine I believe to be an improvement upon all such, because notwithstanding the necessary size and weight of the parts, it is so constructed that it may be easily handled, and tubes as large as say 14″ in diameter may be made and removed from the mandrel without being cut therefrom as has been the case in every machine for making vulcanized fiber of which I have knowledge.

My invention will be understood by reference to the drawings, in which

Figure 1:
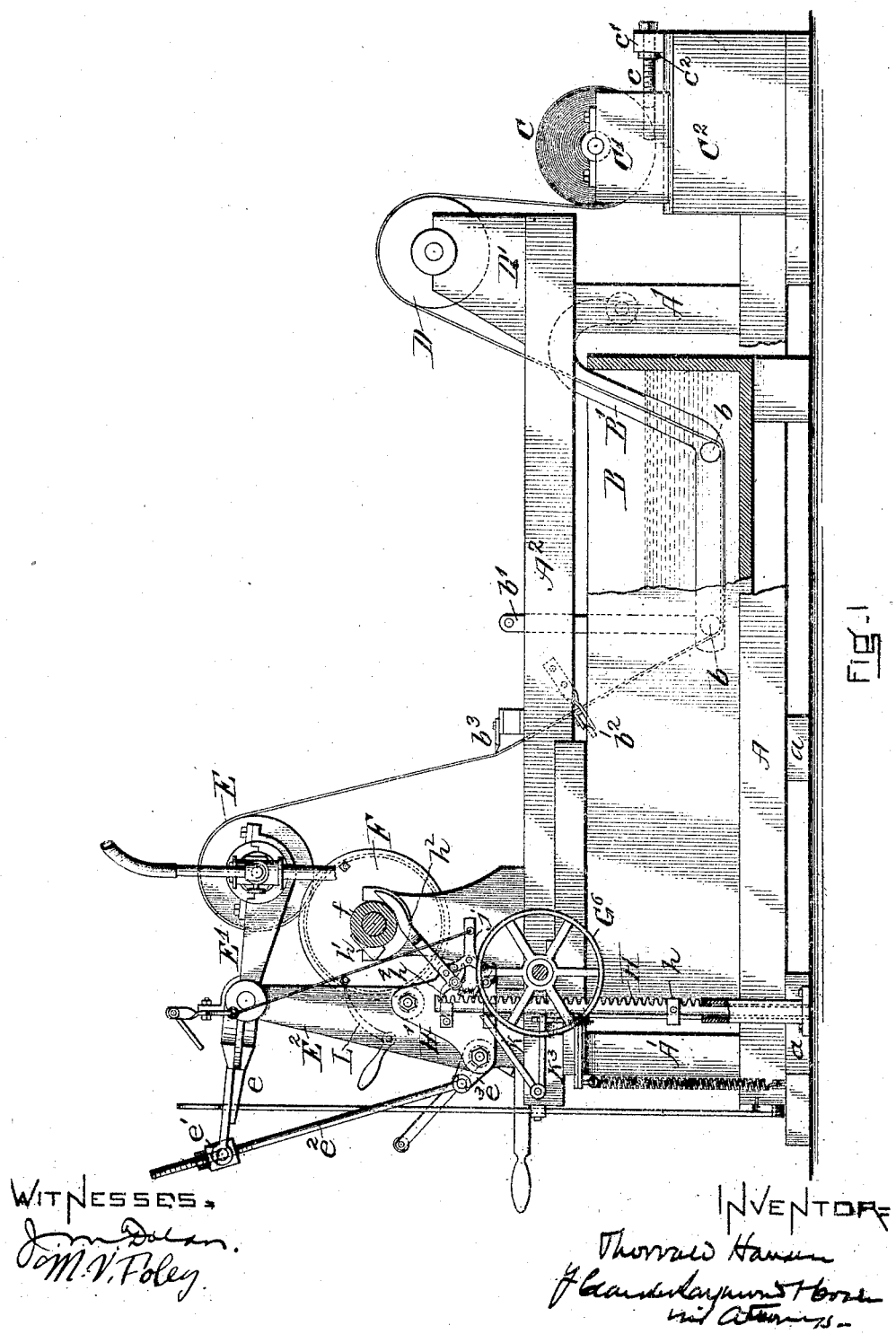
Figure 2:
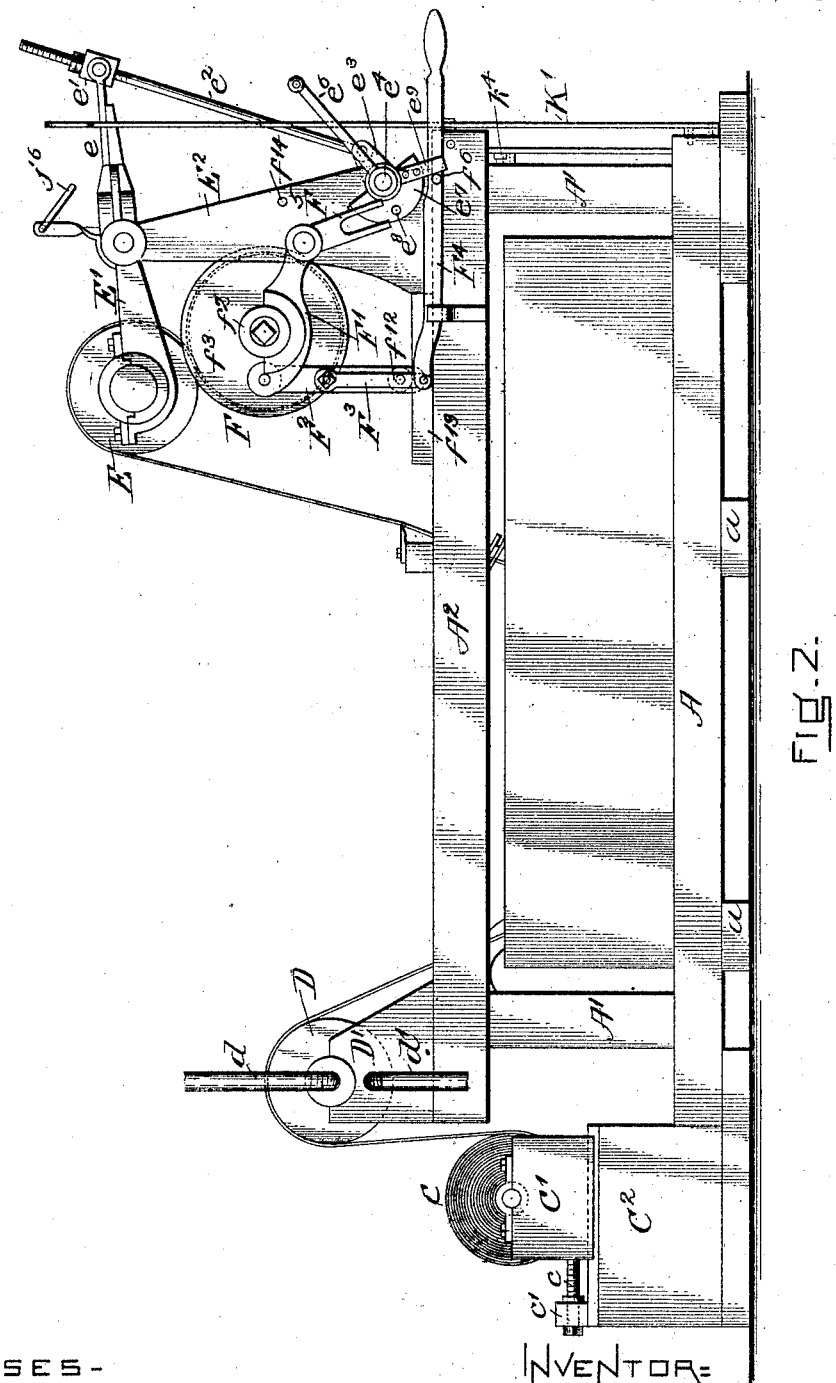
Figure 3:
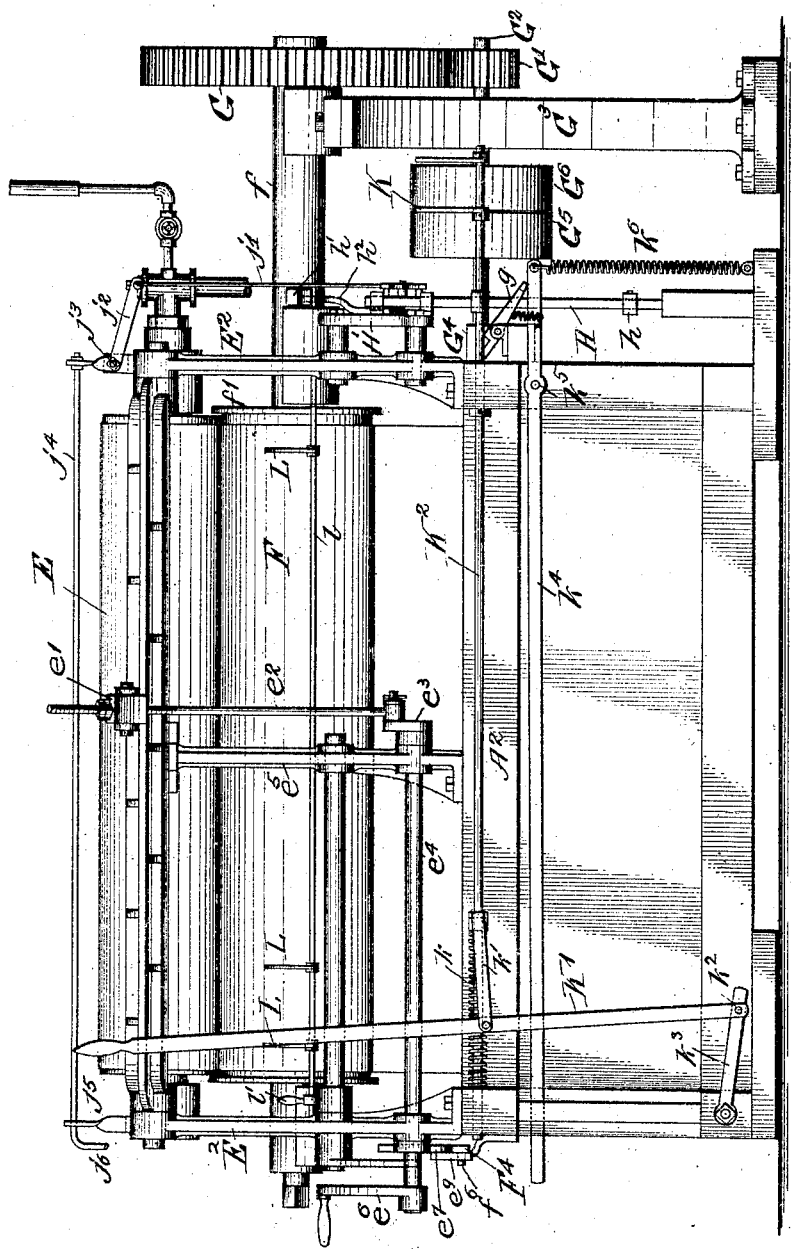
Figure 4:
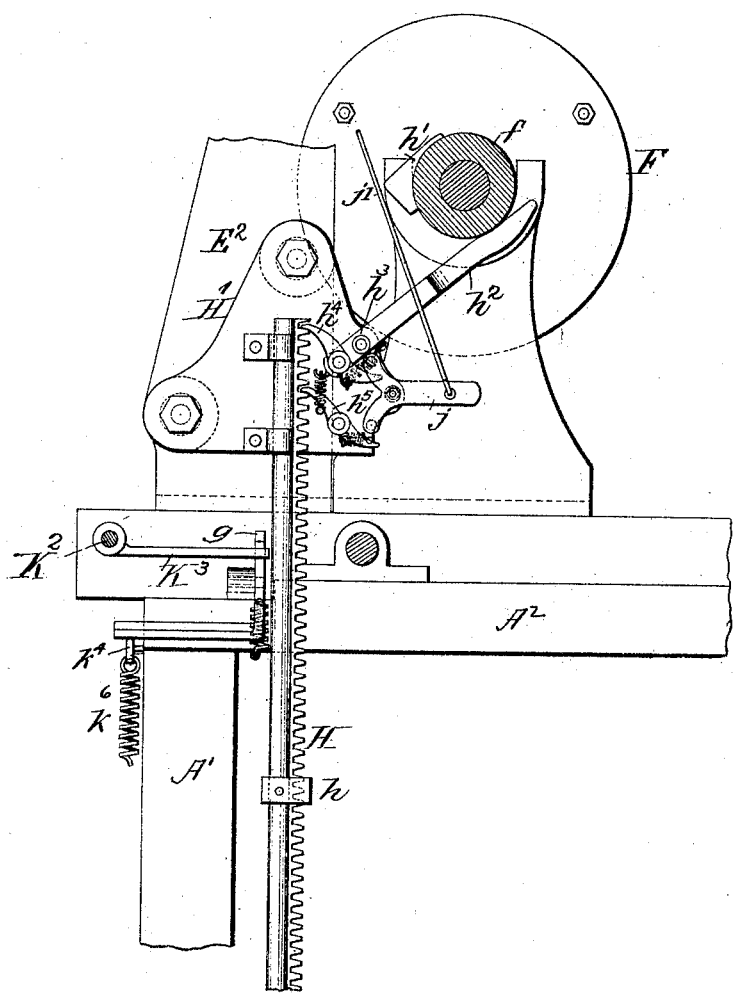

Figure 1 is a side elevation, partly in section, of a machine embodying my invention. Fig. 2 is an elevation of the opposite side thereof. Fig. 3 is a rear view, and Fig. 4 is an enlarged detail showing the stop mechanism. Fig. 5 is a longitudinal section of the mandrel, and Fig. 6 is a cross section on line 6—6 of Fig. 5.

The machine is mounted on a suitable frame comprising base beams A, resting upon suitable blocks $a$, uprights $A^1$ and tie beams $A^2$. Within this frame is located a tank B of suitable width, adapted to contain sulfuric acid or other liquid with which the paper is to be treated. The paper itself is in a roll C, mounted in suitable bearings $C^1$ sliding in ways on a block $C^2$, the location of the bearings being controlled by adjusting screws $c$ passing through blocks $c^1$ mounted on the block $C^2$, each adjusting screw having a collar $c^2$ to prevent it from moving lengthwise in its block $c^1$. The web of paper passes from this roll C up over a steam heated roll D mounted in bearings $D^1$ carried by the tie beams $A^2$, $d$ being a steam inlet, and $d^1$ a steam outlet or waste.

A frame $B^1$, slightly wider than the web of paper, hinged between the uprights $A^1$ and carrying guide rolls $b$ for the paper, is constructed to lie normally within the tank B and to afford means for holding the paper web down within the liquid in the tank, this construction being indicated in Fig. 1, where the web of paper is shown passing under the rolls $b$ and up out from the tank. A handle $b^1$ is attached to the frame $B^1$ for the purpose of lifting the frame out from the tank and replacing it again when it is necessary to renew the paper.

The course of the paper after it leaves the tank is between scrapers $b^2$, $b^3$, located just outside the tank and adapted to engage the surface of the paper so as to free it from any unnecessary amount of acid, these scrapers being mounted upon the tie beams $A^2$. The paper then passes upward over a steam heated roller E and around the mandrel F upon which it is wound, being compressed against it by the heated roller E.

Rotation is given to the mandrel F by means of the gear G mounted upon a sleeve $f$ which projects from the head $f^1$ of the mandrel F. This gear G meshes with a pinion $G^1$ mounted on a shaft $G^2$ running in bearings in the upright $G^3$ and block $G^4$ supported in the frame, the shaft also carrying fast and loose pulleys $G^5$, $G^6$.

The steam heated roll E runs by frictional engagement with the surface of the mandrel or whatever is wrapped about it, and for this purpose it is mounted in bearings on the ends of a yoke lever $E^1$, the forks of which are fulcrumed in uprights $E^2$, one at each side of the machine.

The end of the single arm $e$ of the lever is pivoted to a block $e^1$ adjustably mounted on the rod $e^2$, the lower end of which is connected to a rocker arm $e^3$ on the end of a shaft $e^4$ carried in the upright $e^5$, mounted on the tie beam $A^2$ and in one of the uprights $E^2$. The shaft $e^4$ has also mounted on it a handle $e^6$ which serves not only to lift the roll E off from the mandrel F by means of the rod $e^2$ and lever $e$, but also serves to temporarily remove the bearings from one end of the mandrel and leave it supported by its other end. For this purpose the bearing in question (see Fig. 2) comprises a lever $F^1$, one end of which is suitably shaped to receive the sleeve $f^2$ projecting from the head $f^3$ of the mandrel. This bearing $F^1$ is supported by means of an arm $F^2$ pivoted thereto and carrying a friction roll $f^{12}$ which while the bearing is moving runs on a block $f^{13}$ mounted on the frame thus taking some of the weight of the bearing.

$F^3$ is a lateral extension to and rigid with the arm $F^2$ to connect it with a slide arm $F^4$. The rear end of the bearing lever $F^1$ is forked as at $F^5$. Upon the shaft $e^4$ there is also provided a rocker arm or segment $e^7$ carrying a pin $e^8$ which is adapted to engage a fork $F^5$. A pin $F^6$ is located on the slide arm $F^4$ to engage an arm $e^9$ also carried by the shaft $e^4$. Thus the turning of the crank handle $e^6$ in the first place lifts the roll E, in the second place pushes the arm $F^2$ to the left (see Fig. 2) so as to release the bearing lever $F^1$, and also positively moves this lever around its fulcrum so that it leaves the end of the mandrel free for the withdrawal of the tube. A pin $f^{14}$ limits the movement of the lever $F^8$ in one direction. I have provided my machine also with a stop mechanism whereby when a sufficient number of layers of web have been wound upon the mandrel F, the machine will stop automatically. For this purpose there is a rack H sliding in bearings upon the side of the frame of the machine and provided with a stop $h$ adjustably located thereon. The extension $f$ of the mandrel F carries a cam $h^1$ which engages a lever $h^2$ fulcrumed at $h^3$ upon the plate $H^1$ bolted to studs projecting from the upright $E^2$. Upon the end of the lever $h^2$ is mounted a pawl $h^4$, the proportion and arrangement of these parts being such that with every revolution of the mandrel, and consequently every engagement of the cam $h^1$ with the lever $h^2$, the rack H is raised one tooth by the pawl $h^4$. A holding pawl $h^5$ is provided to engage the teeth of the rack to prevent the rack from slipping back when it is being set by the lever $h^2$. Both pawls are spring controlled. To disengage the pawls and allow the rack to fall, I provide a second lever $j$ adapted to engage both pawls $h^4$, $h^5$, and cause them to release the rack. In order that this may be done by hand I connect the tail piece of this lever $j$ by means of a connecting rod $j^1$ with a lever $j^2$ fulcrumed at $j^3$ to a bracket on the upright $E^2$, which lever is operated by a pull rod $j^4$ mounted in bearings $j^5$, supported on the machine, a handle $j^6$ located at the operating end of the machine enabling the operator to throw these pawls at pleasure. The machine is stopped by shipping the belt from the fast pulley to the loose pulley. For this purpose a belt shipper is provided, shown at K, attached to a sliding rod $K^2$ which lies normally in the position shown in Fig. 3, being held in that position by a spring $k$. To operate this rod to start the machine I provide a handle lever $K^1$ which is connected with the rod by a link $k^1$ and is pivoted at its lower end at $k^2$ to a link $k^3$ connected to the frame. It will be seen from Fig. 3 that by pulling the handle lever $K^1$ towards the left against the force of the spring $k$, the belt shipper will carry the belt from the loose pulley $G^6$ to the fast pulley $G^5$, and in order to maintain it in that position for a proper length of time to allow the machine to make a tube, a latch $g$ is provided with a suitable shoulder which engages an arm $K^3$ projecting from the belt shipper rod $K^2$.

In order to stop the machine automatically the stop $h$ on the rack H having been adjusted at a proper position on the rack according to the desired time of stopping, when the rack has been lifted a proper distance, lifts the latch $g$ and causes its disengagement from the arm $K^3$ on the belt shipper rod, thus allowing the spring $k$ to throw the belt shipper rod and carry the belt from the fast to the loose pulley. In order that this may be done by hand a long lever $k^4$ is provided pivoted at $k^5$, and controlled by the spring $k^6$, this lever engaging the latch and causing it to release the shipping rod in like manner.

After the machine has been stopped automatically as described, if it is desired to trim up the edges of the tube which has been wound, this may be accomplished by means of knives L mounted upon a rocker rod $l$, suitably supported at the end of the machine, and provided with a handle $l^1$. By turning this handle these knives can be brought against the tube and each edge cut, and if desired, a piece cut off from one end. This having been accomplished and it being desired to remove the tube from the mandrel, the handle $e^6$ is moved so that the roll E is lifted and at the same time the bearing $F^1$ of one end of the mandrel is dropped so that the mandrel is supported entirely from the power end of the machine. In order to get the tube off the mandrel, however, I prefer to make the mandrel expansible in character, and have shown one means for doing this in Figs. 5 and 6. The main part $F^7$ of the mandrel is made preferably of steel, for example, having a certain amount of elasticity, and is attached to the head $f^1$ by means of bolts $f^4$. Through it runs a shaft $f^5$ which extends outward through a loose head $f^3$ at the opposite end of the mandrel so that the mandrel itself is centered upon this shaft. The end $f^6$ of this shaft is squared so as to receive a wrench.

The mandrel is not entirely cylindrical there being a gap between its two ends which gap is provided, as shown in Fig. 6, with inwardly projecting edges, leaving a wedge-like cavity between them, and in this cavity sets a wedge $f^7$ running the length of the cylinder which is thrown up to form a closure and complete the cylinder by means of links $f^8$ connected to eccentric straps $f^9$ carried on eccentrics $f^{10}$ keyed to the shaft $f^5$. Turning the shaft $f^4$ therefore withdraws the wedge $f^7$ and allows the mandrel to collapse. The loose head $f^3$ being removed the tube can then be slipped off from the mandrel without trouble.

In operation the web of paper being supplied at C and its end carried over the stationary surface D and through the tank B of sulfuric acid under the rolls $b$ is passed between the scrapers $b^2$, $b^3$, and up over the roll E so that its end is caught between this roll and the mandrel F. Steam being supplied to D and E the mandrel F is rotated so that the web is wound upon it while still wet and hot, and successive layers are compressed against each other by means of the roll E. During the rotation of the mandrel F the rack H is raised step by step until the stop $h$ coming in contact with the latch $g$ causes it to release the belt shipper which had previously been set to start up the machine. Thus the machine is caused to stop and the portion of the web mounted upon the mandrel is cut from the rest of the web. The mandrel is then turned one or more revolutions to give a final compression to the layers, and during these final revolutions the handle $l$ is turned to cause the knives L to trim and cut the compressed tube which has then been formed in the desired manner according to the location of these knives. The machine being again stopped, this time by hand through the action of the hand lever $k^4$, the next act is the releasing of the free end $f^3$ of the mandrel in order that the tube may be slipped off, and for this purpose the handle $e^6$ is pushed downward so as to remove the support $F^2$ from under the free end of the lever $F^1$, and a further movement of the handle causes the engagement of the pin $e^8$ with the fork $F^5$ so that the lever $F^1$ is positively moved away from its position as a bearing floor for that end of the mandrel. This same action causes the roll E to be lifted off from the mandrel, the handle $e^6$ being moved so far around that the rocker arm $e^3$ will come into a substantial line with the connecting rod $e^2$, and so hold the roll E in its elevated position. The free head $f^3$ of the mandrel is then removed and the tube is slipped off from the end, after which the acid may be washed out from it and it will be found when dry to be composed of what is ordinarily known as vulcanized fiber, having a tenacious, homogeneous character, and without any apparent layers of the web superimposed upon each other.

I have described my invention somewhat in detail, the invention being embodied therein in the best form now known to me, but it is evident that these details may be somewhat varied without taking from the machine those characteristics which are described in the claims.

What I claim as my invention is:

1. In a machine of the character described, a mandrel, a journal on either end thereof, bearings for said journals, one of said bearings movable as a whole in a plane transverse to the axis of the journal supported thereon, whereby the mandrel may be supported by one journal.

2. In a machine of the character described, a mandrel, a journal on either end thereof, bearings for said journals, one of said bearings movable radially downward in a plane transverse to the axis of the journal supported thereon, whereby the mandrel may be supported by one journal.

3. In a machine of the kind described, a mandrel, a pivoted lever having thereon an entire bearing for said mandrel, another lever pivoted to said bearing lever for controlling the position thereof, and means for actuating said controlling lever.

4. In a machine of the kind described, a mandrel, permanent means supporting it at one end, a lever having in one end a journal bearing for supporting the other end of said mandrel, and means engaging the other end of said lever and moving it positively towards and from its bearing position comprising a rocker arm, means for operating it and means carried thereby to engage said lever arm, as described.

5. In a machine of the kind described, a mandrel, and a roll adapted to run thereon, and means for moving said roll into and out of contact with said mandrel, comprising a lever carrying journal boxes in which said roll turns, in combination with a rock shaft and a connecting rod operated by said rock shaft and connecting said rock shaft with said lever, as described.

6. In a machine of the kind described, a mandrel supported in a fixed bearing at one end and in a movable bearing at the other end, a roll adapted to run in surface engagement with said mandrel and be moved out of engagement therewith, and means for simultaneously removing said movable bearing and said roll from engagement with said mandrel, as described.

7. In a machine of the kind described, a mandrel carrying a cam surface, a lever actuated by said cam surface, a rack carrying a stop, means connecting said lever and said rack whereby said rack will be actuated by said lever, and a belt shipper and connections whereby the movement of said rack beyond a predetermined point will operate said belt shipper, as described.

8. In a machine of the kind described, in combination with a mandrel and a stop actuated thereby, a belt shipper comprising a spring controlled rod and a latch located to be engaged by said stop when said stop has been actuated beyond a predetermined point, as described.

9. A mandrel comprising a segment of a cylinder, and having a closure adapted to complete the cylindrical surface of said mandrel, and means operated by turning the mandrel shaft to move said closure towards and from its closed position.

10. In a machine of the kind described, a mandrel comprising a segment of a cylinder, and having a closure adapted to complete the cylindrical surface of said mandrel, and means whereby said closure may be moved towards and from its closed position, comprising a shaft forming the axis of said mandrel, a plurality of eccentrics mounted on said shaft, a corresponding number of eccentric straps carried by said eccentrics, and links connecting said straps with said closure, as described.

THORVALD HANSEN.

Witnesses:
GEORGE O. G. COALE,
M. V. FOLEY.